United States Patent [19]

Martulli et al.

[11] Patent Number: 5,038,224
[45] Date of Patent: Aug. 6, 1991

[54] VIDEO IMAGING DEVICE IN A TELECONFERENCING SYSTEM

[75] Inventors: Donald L. Martulli, Clark; Lanny S. Smoot, Morris Township, Morris County, both of N.J.

[73] Assignee: Bell Communications Research, Inc., Livingston, N.J.

[21] Appl. No.: 455,309

[22] Filed: Dec. 22, 1989

[51] Int. Cl.$^5$ .................. H04N 1/40; H04N 1/00
[52] U.S. Cl. .................. 358/446; 358/401; 358/475; 250/229; 250/201.1
[58] Field of Search ............... 358/401, 408, 446, 447, 358/448, 450, 452, 475, 487, 488, 494, 497, 400; 250/201.1, 201.9, 229, 205; 355/71, 83; 350/339, 330

[56] References Cited

U.S. PATENT DOCUMENTS

| | | | |
|---|---|---|---|
| 4,424,535 | 1/1984 | Rothbart et al. | 358/498 |
| 4,771,336 | 9/1988 | Ohtorii | 358/497 |
| 4,890,314 | 12/1989 | Judd et al. | 379/53 |
| 4,945,423 | 7/1990 | Takanashi et al. | 358/233 |

OTHER PUBLICATIONS

"Videographe" Thomson Video Simiv, 67, Quai Paul-Doumer-92401 Courbevoie, R. C. S. Paris B301851564.

Primary Examiner—Edward L. Coles, Sr.
Assistant Examiner—Jerome Grant, II
Attorney, Agent, or Firm—James W. Falk; Leonard Charles Suchyta

[57] ABSTRACT

A video imaging device permits a first teleconference participant to transport information contained on copy material to a second teleconference participant for display in a portion of a video image viewed by the second teleconference participant. The video imaging device automatically reconfigures itself to transmit information contained on transparent, translucent, or opaque copy material.

12 Claims, 5 Drawing Sheets

STATE DIAGRAM

| COPY MATERIAL | DIFFUSING SURFACE | INTERNAL LIGHT SOURCE |
|---|---|---|
| TRANSPARENT (EXTERNAL LIGHT ABOVE FIRST THRESHOLD) | TRANSLUCENT | OFF |
| TRANSLUSCENT (EXTERNAL LIGHT BETWEEN FIRST AND SECOND THRESHOLD) | TRANSPARENT | OFF |
| OPAQUE (EXTERNAL LIGHT BELOW SECOND THRESHOLD) | TRANSPARENT | ON |

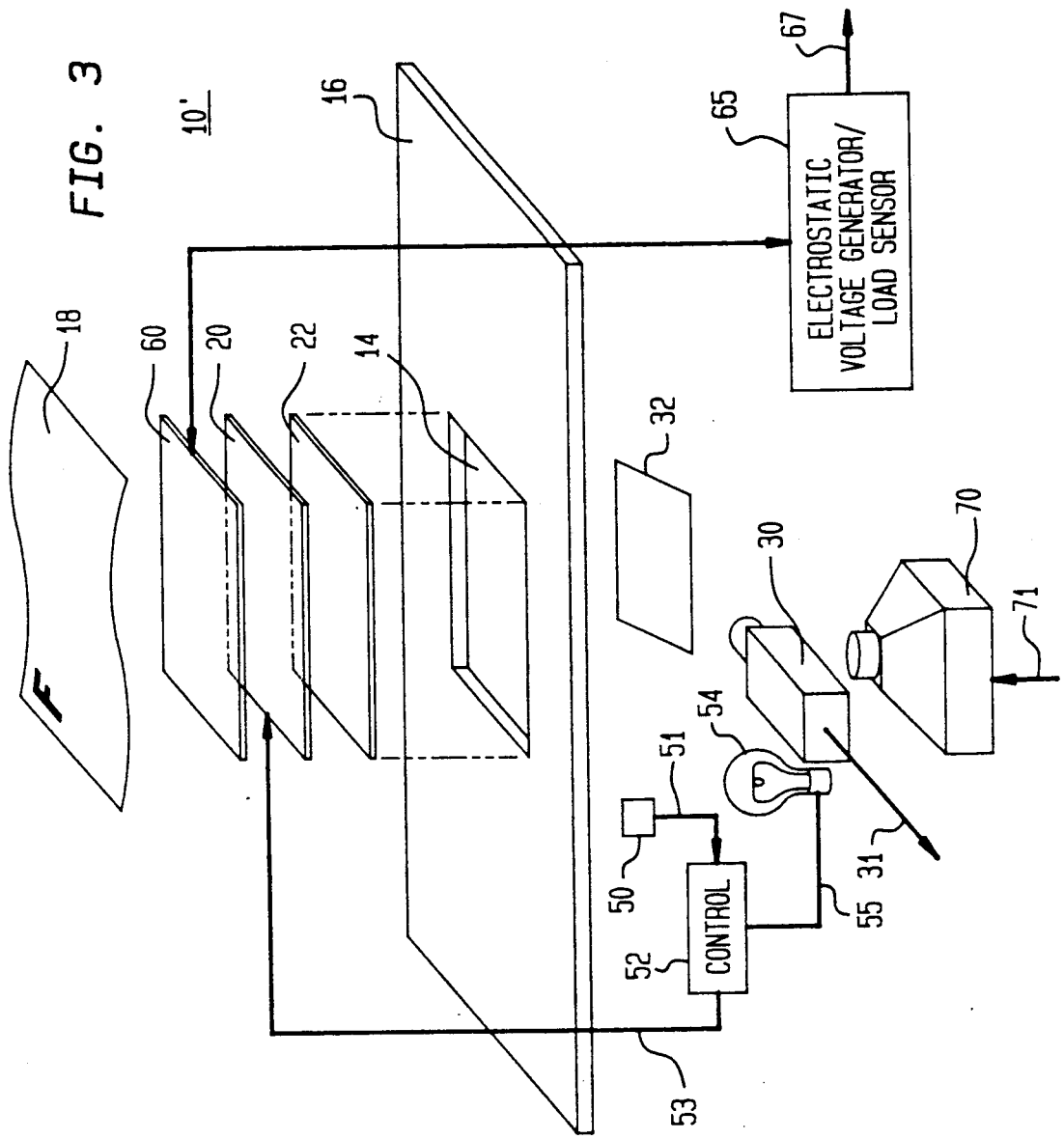

VIDEO IMAGING DEVICE IN A TELECONFERENCING SYSTEM

FIELD OF THE INVENTION

The present invention relates to a video imaging device for permitting a first teleconference participant to transmit information contained on copy material to a second teleconference participant for display in a portion of a video image viewed by the second teleconference participant. The copy material may be transparent as in the case of a transparency or slide, may be translucent as in the case of a sheet of paper, or may be opaque as in the case of a page of a hardbound book. In particular, the video imaging device of the present invention, which is associated with a teleconferencing station utilized by the first teleconference participant, automatically reconfigures itself to transmit information contained on a transparent, translucent or opaque copy material to a second teleconferencing station utilized by the second teleconference participant, without the first teleconference participant having to take active control steps.

BACKGROUND OF THE INVENTION

The traditional teleconference facility is generally a shared, extremely high cost facility whose use is tightly scheduled. Such teleconference facilities put extreme limitations on the normal human protocols for interaction. Most conventional teleconference facilities offer some version of an NTSC (home television like) video display on relatively small sized monitors. When the number of teleconference participants at a sending end of a teleconference is larger than one, the image of each participant occupies a small portion of an already small viewing area at the receiving end. As a result, it becomes difficult for viewers at the receiving end of such an image to pick up non-verbal queues from the speaker's face and body. Indeed, in many cases, it is often difficult to discern who of the many participants is actually speaking.

In contrast to the conventional teleconference facility described above, Judd et al, U.S. Pat. No. 4,890,314 issued Dec. 26, 1989, describes a teleconferencing system which is especially suited for casual communication between groups of participants at either end of a telecommunications link. The contents of U.S. Pat. No. 4,890,314 are incorporated herein by reference. The teleconferencing system of the above-identified patent provides video and audio communications for the groups of participants. Illustratively, common conference rooms and lounges may be adapted for use as teleconferencing stations. In such a room, one wall may be adapted as a video display for displaying a high resolution video image. The display allows participants at the other end of a teleconference to appear almost lifesized. The high resolution display has a wider aspect ratio than standard NTSC video to match the generally wider, than taller, view of side by side seated conference participants.

One candidate for providing such a high resolution, wide aspect ratio, video image is High Definition Television (HDTV) equipment. Unfortunately, the high cost and high transmission bandwidth (approximately 1 Gigabit/sec for digital transmission and 30 Mhz for analog transmission) and the requirements for high lighting levels at the conference sites make presently available HDTV equipment unsuitable for casual teleconferencing applications.

The above-mentioned U.S. Pat. No. 4,890,314 discloses an alternative approach for forming a high resolution video image wherein two or more cameras are utilized to produce a signal with more resolution (i.e. more pixels) than a single camera. In such a system each camera has a projector or other display device associated therewith to produce a sub-image which forms a portion of the high resolution video image. When the cameras are arranged to have contiguous fields of view, the sub-images provided by the various cameras may be positioned adjacent one another to form a single high resolution image. Techniques for arranging the cameras so that they have non-overlapping and/or contiguous fields of view are described in the above-mentioned U.S. Pat. No. 4,890,314. In general, the cameras cannot simply be placed next to each other as such an arrangement results in a complex situation wherein some locations are in the field of view of both cameras and some locations are in the field of view of neither cameras. To overcome this problem, the cameras are placed at spaced apart positions and a mirror system is illustratively utilized to insure that the cameras have contiguous fields of view.

When such a technique for forming a high resolution image is utilized, a station for use in a teleconferencing system comprises first and second video display devices for receiving first and second video signals generated by first and second imaging devices (e.g. video cameras) having first and second spaced apart positions at a location remote from the teleconferencing station and substantially contiguous fields of view. The first and second display devices display first and second low resolution sub-images, respectively, in response to the first and second video signals. The first and second low resolution sub-images are displayed in adjoining positions so that they merge contiguously to form a single high resolution video image. The teleconferencing station also includes third and fourth low resolution video imaging devices having third and fourth spaced apart positions at the teleconferencing station, for generating third and fourth video signals corresponding to third and fourth low resolution video sub-images. The third and fourth video signals are transmitted to the remote location for formation of a second high resolution video image at the remote location.

An important aspect of the type of teleconferencing station described above is the simplicity of its user interface. Generally, there are no controls for the user to adjust. Illustratively, a first teleconferencing station is continuously connected to a particular second teleconferencing station at a remote location so that users are free to interact casually and spontaneously with whomever is at the other end.

As previously indicated above, the above described teleconferencing station may be incorporated as part of a conference room. The conference room generally includes a wider than taller high resolution video display, inconspicuous cameras, a seating area, and a conference table. Illustratively, each teleconferencing station in the teleconferencing system is arranged so that a group of participants at each station can sit behind a local conference table and have a feeling of "being together" at a conference with another group of participants sitting behind their own conference table at their own teleconferencing station. The basic teleconferencing station described above provides groups of users with the ability to see and talk to each other. Often, however, users have the desire (especially in a business setting) to show each other information formed on copy material. The information may be contained on a transparent copy material such as a transparency or slide. Alternatively, the information may be written or otherwise impressed on a translucent copy material such as a single piece of paper. Alternatively, the information may be contained in an opaque copy material such as a page of a hardbound book.

It is an object of the present invention to provide teleconference participants with the ability to exchange information contained on such copy material.

Devices are available (e.g. the VIDEOGRAPHE device of Thomson Video) which enable copy material to be displayed on a video display. However, such prior art devices have a number of shortcomings. The prior art devices do not reconfigure themselves automatically to display information contained in a transparent, translucent, or opaque copy material without the need for user intervention, as would be highly desirable in the type of informal teleconferencing setting described above. Furthermore, the prior art devices provide no mechanism by which such devices can be used with a teleconferencing system, wherein each teleconferencing station includes a high resolution video display which forms a high resolution video image by combining a plurality of low resolution video sub-images. In particular, the prior art devices do not provide a signal which is asserted in the presence of copy material to activate external equipment so that a video image of the copy material can be combined with other video images.

Accordingly, it is an object of the invention to provide a video imaging device which enables teleconference participants to exchange information contained in copy material, wherein the copy material is transparent, translucent, or opaque.

It is a further object of the invention to provide a video imaging device for displaying information contained in copy material, which imaging device automatically reconfigures itself depending on whether the copy material is transparent, translucent, or opaque.

It is also an object of the invention to provide a video imaging device for displaying information contained in copy material on a video display of a teleconferencing station, which video display forms a high resolution image by combining a plurality of low resolution video sub-images.

SUMMARY OF THE INVENTION

Thus, the present invention is directed to a device for use with a teleconferencing station to enable one teleconference participant to transmit information contained in copy material to another teleconference participant. Preferably, an operating surface of the device is flush mounted in the surface of a conference table utilized at the teleconferencing station. This enables a user to utilize the device merely by placing copy material down on the table.

The operation of the imaging device of the present invention is automatic. This means that the device's imaging capabilities are enabled when copy to be transmitted is placed on the device's operating surface and disabled when there is no copy material present. In addition, the device automatically reconfigures itself to transmit copy contained in transparent, translucent, or opaque copy material without user intervention.

Through use of a PIP (picture-in-picture) device, the transmitted copy material may be displayed at a remote teleconferencing station as an inset in or as a dominant portion of one of the sub-images utilized to form a high resolution video display.

In an illustrative embodiment, the video imaging device of the present invention comprises a highly sensitive and wide dynamic range video camera which is placed under the operating surface of the display device to view the copy material to be transmitted. A front surface mirror is utilized to provide non-reversed and non-inverted camera images.

The operating surface of the device is a diffuser surface which illustratively is formed from a sheet of light scattering liquid crystal material. The transmissivity of the liquid crystal diffuser surface is controlled by an optical sensor and associated control circuitry. When the copy material is formed from a transparent background material with nominally opaque information impressed thereon, the optical sensor and control circuitry cause the liquid crystal diffuser surface to be in a translucent state so that the clear areas of the transparent copy material appear as white (as intended) in the corresponding video image. When the copy material is translucent, the optical sensor and control circuitry sense a reduced amount of light and causes the diffuser surface to be transparent. When the copy material is opaque, the optical sensor senses substantially no or very little light. Thus, an internal source of illumination is activated for the copy material as no external ambient light illuminates the copy material and the diffuser surface is maintained in a transparent state. In this manner the inventive imaging device automatically transmits information from a variety of copy materials without requiring intervention by the user.

BRIEF DESCRIPTION OF THE DRAWINGS

FIG. 3 schematically illustrates an alternative video imaging device for use in a teleconferencing system in accordance with an alternative illustrative embodiment of the present invention.

DETAILED DESCRIPTION OF THE INVENTION

Figure 1:
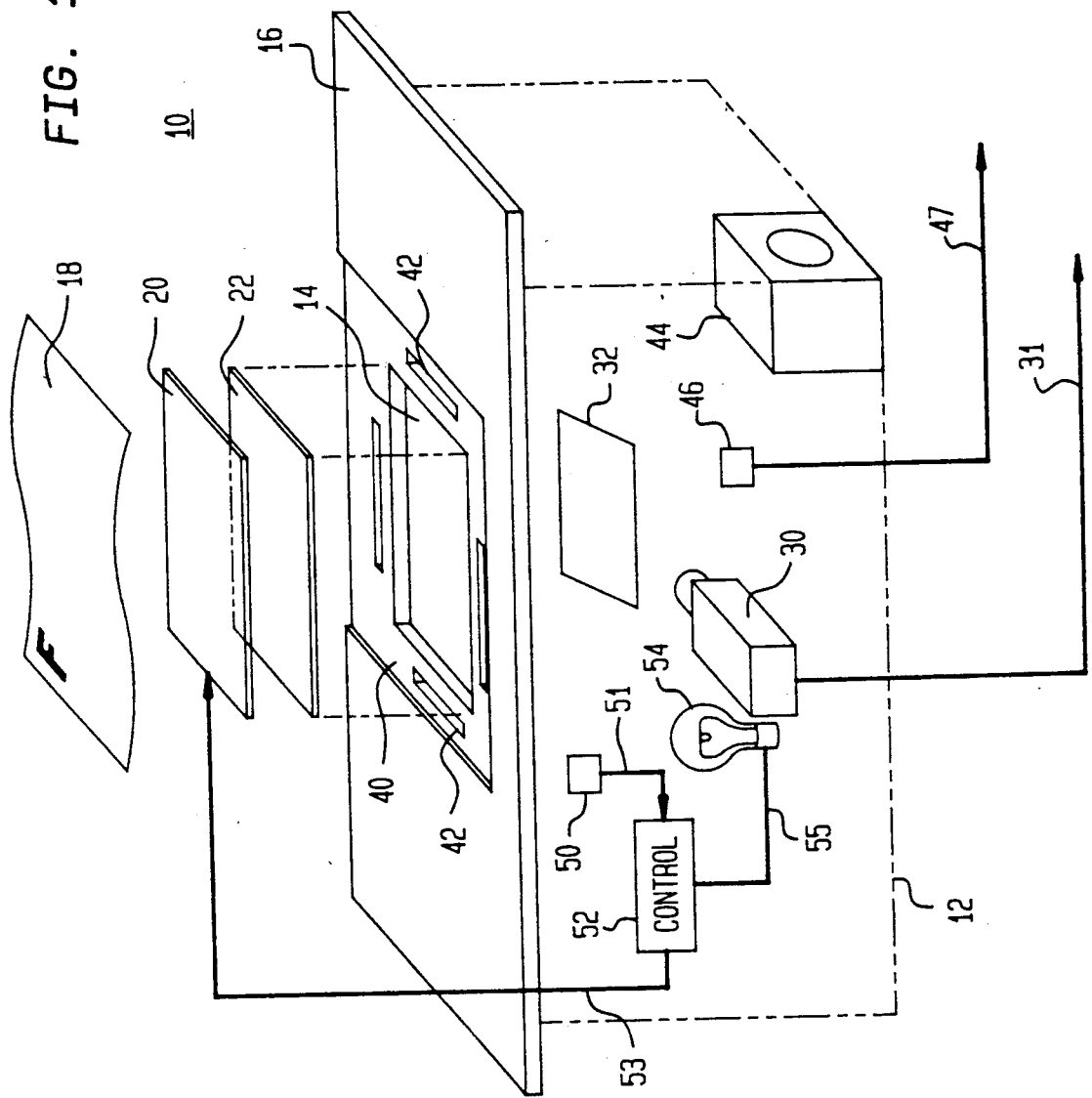
FIG. 1 schematically illustrates a video imaging device for use in a teleconferencing system in accordance with an illustrative embodiment of the present invention.

A video imaging device in accordance with an embodiment of the present invention is illustrated in FIG. 1. The video imaging device 10 is located in a sealed enclosure 12 underneath a cutout 14 in a table surface 16. The device 10 can transmit to a remote location a video image of information contained in the copy material 18. As indicated above, the copy material 18 may be transparent, translucent, or opaque.

The operating surface of the device 10 is formed by a diffuser surface 20 which fills in the cutout 14. Thus, a user of the device 10 places copy to be transmitted on to the liquid crystal diffuser surface 20. The diffuser surface 20 is formed from a sheet of light scattering liquid crystal material. This material is normally in a translucent state, however, with the application of an electric field, the material becomes transparent. To provide strength, the liquid crystal sheet 20 may be mounted on the clear glass sheet 22.

The video imaging device 10 includes a video camera 30. Preferably, the video camera 30 is highly sensitive, has a wide dynamic range and an automatic iris. When the copy material 18 is a transparency or a single sheet of paper, the sheet of copy material is placed face up on the surface 20 so that it can easily be read by the user. Thus, the video camera 30 which is located inside the sealed enclosure 12, can only view the underside of the sheet of copy material. To prevent the video camera 30 from transmitting a reversed or inverted image, the mirror surface 32 is utilized so that an image of the underside of the copy material is reflected off the mirror surface 32 and into the camera 30. The mirror surface 32 is oriented a 45° angle with respect to the surface 20.

To use the video imaging device 10 of FIG. 1, it is desirable to maintain a close contact between the copy material 18 and the liquid crystal surface 20. If this is not done, the video camera 30 will transmit a badly distorted image such as a double image.

Illustratively, a vacuum hold-down technique is utilized to maintain the copy material in close contact with the surface 20. In this case, the cutout region 14 is surrounded by a trough 40 which includes a plurality of slots 42 leading to the inside of the enclosure 12. The slots are supplied with a source of vacuum. One way to provide this vacuum source is by means of an electric fan blower 44 located inside the sealed enclosure 12. The blower 44 maintains a negative pressure throughout the inside volume of the enclosure 12. This source of vacuum applied along all four edges of the copy material 18 serves to hold it tightly pressed against the liquid crystal surface 20.

Along with the vacuum source 44, the vacuum sensor 46 may also be utilized. The vacuum sensor serves to determine whether copy material is actually present on the surface 20 of the device 12. To accomplish this, the vacuum sensor 46 is set so that the normal level of vacuum provided by the blower 44 inside the enclosure 12 is insufficient to operate the vacuum sensor 46. However, when copy material is placed over the slots 42, the vacuum inside the enclosure 12 rises to a level sufficient to close the switch 46 and causes a signal to be transmitted on line 47. Illustratively, the signal on line 47 can be used to activate circuitry which enables the image captured by the video camera 30 and transmitted via line 31 to be displayed at a remote teleconferencing terminal. Such circuitry is discussed below in greater detail in connection with FIGS. 5 and 6. Alternatively, in a particular embodiment of the invention, the signal on line 41 may be utilized to activate the video camera 30.

The video imaging device 10 also includes the optical sensor 50, the control circuit 52, and the internal light source 54. The control circuit 52 receives signals from the optical sensor 50 via line 51, selectively outputs a control voltage on line 53 to control the state of the liquid crystal surface 20, and outputs voltage signals on line 55 to selectively turn on and off the internal light source 54. The optical sensor 50 and the control circuit 52 enable the device 10 to automatically reconfigure itself so that the video camera 30 can transmit information when the copy material 18 is transparent, translucent or opaque.

Illustratively, in normal operation, the control circuit 52 applies no voltage to the liquid crystal surface 20 via line 53 so that the surface is maintained in a translucent or scattering state. When the copy material 18 is transparent, the amount of light transmitted to the optical sensor 50 does not change very much (i.e. a relatively large amount of light reaches the sensor 50). This large amount of light is detected by the optical sensor 50. When the amount of light is above a first threshold, the control circuit 52 connected to the sensor 50 determines that the copy material is transparent and that no electric field should be applied to the liquid crystal surface 20 so that the liquid crystal surface remains in its scattering or translucent state. When the surface 20 is maintained in its translucent state, the clear portions of the copy material appear as white in the corresponding video image. In addition, the internal light source 54 remains off as sufficient externally generated ambient light illuminates the copy material.

When the copy material is translucent, the optical sensor 50 will detect the amount of ambient light being transmitted into the enclosure 12 through the copy material as being below the first threshold but above a second threshold. This information will be used by the control circuit 52 to determine that an electric field should be applied to the liquid crystal material 20 to cause it to become transparent. In this mode, sufficient ambient light will pass through the translucent copy material and the now transparent surface 20 so that the camera 30 can form a video image. To accomplish this, the video camera 30 adjusts its automatic iris such that the information imprinted on the translucent copy material will be properly viewed from its reverse side and an image transmitted to a remote location. It should be noted that sufficient light passes through the translucent cop material 18 and transparent surface 20 so that the internal light source 54 is maintained as off.

When the copy material 18 is truly opaque, ambient light is no longer transmitted through the copy material into the inside of the enclosure 12. Thus, when the light reaching the sensor 52 falls below the second threshold, the control circuit 52 applies an electric field to the liquid crystal surface 20 so that it is transparent and, in addition, the control circuit 52 turns on the internal light source 54 so that the information to be transmitted is illuminated from inside the device.

As indicated above, a user will normally put transparent or translucent copy material face up on the surface 20 so that it can easily be read by him or her. Thus, the camera 30 will view the underside of the copy material and to prevent image reversal or inversion the mirror surface 32 is utilized. However, opaque copy material, such as a page from a hardbound book, will be placed face down on the surface 20. In this case, there is a mirror image reversal in comparison to the mode of operation described above for the transparent and translucent copy material. To accommodate this reversal, there are several simple solutions. First, when opaque copy material is detected, the control circuit 52 can reverse the scan direction of the camera 30. Alternatively, a second video camera (not shown) which has the correct spatial orientation can be activated by the control circuit to view the opaque copy material. Finally, a second mirror (not shown) can be used to correct for the reversal which is present when opaque copy material is utilized.

Figures 2, 4:
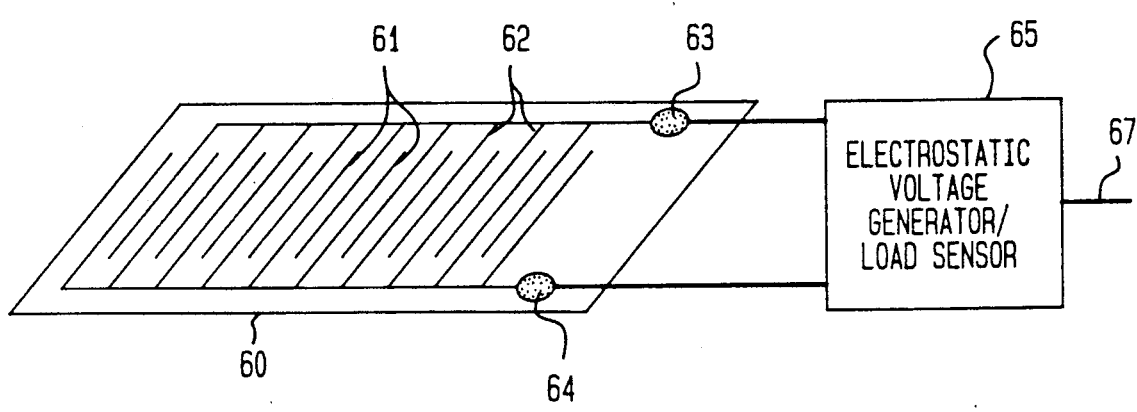
FIG. 2 illustrates a state diagram for a control circuit of the imaging device of FIG. 1.
FIG. 4 schematically illustrates an electrostatic hold down mechanism for use in connection with the device of FIG. 2.

FIG. 2 is a state diagram for the control circuit 52 of FIG. 1. FIG. 2 shows the state of the liquid crystal diffuser surface and the internal light source for transparent, translucent, or opaque copy material (as defined by whether the external light is above a first threshold, between the first and second thresholds, or below the second threshold).

An alternative video imaging device 10' is illustrated in FIG. 3. Like elements in FIGS. 1 and 3 have the same identifying numerals. The video imaging device 10 of FIG. 1 and the video imaging device 10' of FIG. 3 operate in the same manner except that the vacuum hold-down technique of FIG. 1 is replaced by an electrostatic hold-down technique. Thus, in FIG. 3 the blower 44, the vacuum sensor switch 46, the trough 40 and the slots 42 are eliminated. Instead, the electrostatic hold-down sheet 60 is utilized. The sheet 60 is inserted in the cutout 14 above the liquid crystal diffuser sheet 20.

As shown in FIG. 4, the electrostatic hold-down sheet 60 carries two sets of interdigitated conductors 61 and 62. The conductors 61 and 62 are made of a transparent material. A voltage is applied to the terminals 63 and 64 from the electrostatic voltage generator and load sensor 65 to produce an electrostatic field. This field exerts a strong hold-down force on the copy material 18. A "copy material present" signal can be derived on line 67 by sensing the loading of the high voltage power supply due to the presence of the copy material bridging the interdigitated conductors. Like the signal on line 47 of FIG. 1 produced by the vacuum sensor 46, the signal on line 67 can be used to activate circuitry which enables the image captured by the video camera 30 and transmitted via line 31 to be displayed at a remote teleconferencing terminal.

The video imaging device 10' of FIG. 3 may also be used as a local auxiliary video display terminal when it is not transmitting copy material. To this end the imaging device 10' of FIG. 3 includes the video projector 70. The projector 70 is adopted to display a video image received via line 71 on the bottom surface of the normally translucent liquid crystal sheet 20. Illustratively, the image to be displayed is reflected off of the mirror surface 32. In this case, the mirror 32 is half-silvered. Suitable small projectors such as LCD projectors for use in the inventive device are available commercially from Seiko, Sharp and Kodak. The signal on line 67 can be used to enable the projector 70 and/or to disable the projector 70 when copy material 18 is on the hold-down surface 60. Additionally, the signal on line 67 may be utilized to activate the video camera 30.

Figure 5:
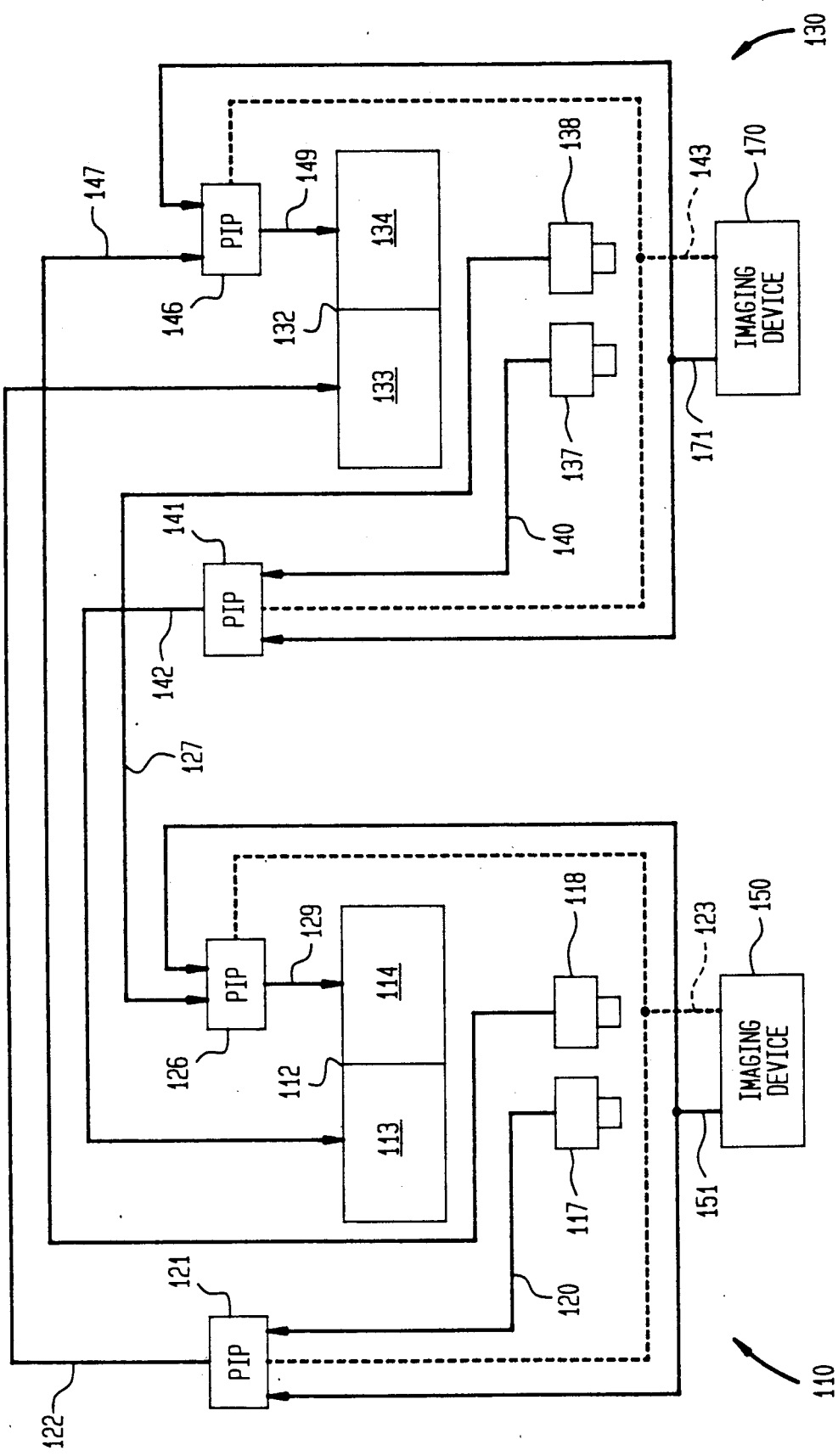
FIG. 5 schematically illustrates the interconnection of the video imaging device of FIG. 1 or FIG. 2 with a teleconferencing system.

FIG. 5 schematically illustrates a teleconferencing system 100 which makes use of the inventive video imaging device. The teleconferencing system 100 comprises two teleconferencing stations 110 and 130. Each station 110, 130 includes a high resolution video display 112, 132. The high resolution video displays 112, 132 form their high resolution video images from adjacently positioned low resolution video sub-image portions 113, 114 and 133, 134.

Each station 110, 130 also includes two low resolution video cameras 117, 118 and 137, 138. The cameras 117, 118 and 137, 138 are positioned such that they have contiguous fields of view as described in the above-mentioned U.S. Pat. No. 4,890,314. In normal operation the low resolution video sub-images captured by the cameras 137 and 138 are displayed in the display portions 113 114 respectively to form a single high resolution image at the station 110. Similarly, in normal operation, the low resolution video sub-images captured by the cameras 117, 118 are displayed in the display portions 133, 134 respectively at the station 130 to form a single high resolution video image.

The stations 110, 130 each include a video imaging device 150, 170 in accordance with the present invention. Consider first the operation of the video imaging device 150 at the station 110. When the video imaging device 150 is not being utilized, the signal from the camera 117 is transmitted via line 120, picture-in-picture (PIP) device 121 and line 122 to the image display portion 133 at the station 130. When the video imaging device 150 is utilized (as indicated by a control signal from the vacuum sensor 46 of FIG. 1, or load sensor 65 of FIG. 3 on line 123), the PIP device 121 merges the video signal from the imaging device 150 on line 151 with the signal from the camera 117 on line 121 so that a composite image is transmitted via line 122 to the display portion 133 at the station 130. The composite image may comprise the imaging device output as the dominant portion with the image from the camera 117 as an inset or the image from camera 117 as the dominant portion with the image from the device 150 as an inset.

When the video imaging device 150 is utilized, the signal on line 123 (as generated by vacuum sensor 46 or load sensor 65) also activates the PIP device 126. This PIP device combines the video signal on line 127 from the camera 138 at the station 130 with the video signal from the imaging device 150 transmitted via line 151 so that a teleconference participant at the station 110 can view his own copy material as part of the sub-image transmitted from the PIP 126 on line 129 and displayed on the display portion 114.

The video imaging device 170 at the station 130 operates in the same manner. When the imaging device 170 is activated by placing copy material on it, the PIP device 141 combines the video signal from the camera 137 on line 140, with the video signal from the imaging device 170 on line 171 to form a composite image which is transmitted via line 142 to the display portion 113 at the station 110. Similarly, the PIP device 146 combines the video signal from the imaging device on line 171 with the signal on line 147 from the cameras 118 so that a composite image is transmitted via line 149 for display at the display portion 134. This enables a user at the station 130 to view his own copy material. The PIP devices 141 and 146 are enabled by a control signal (generated by a vacuum sensor or load sensor) on line 143 when copy material is placed on an operating surface of the imaging device 120.

Figure 6A:
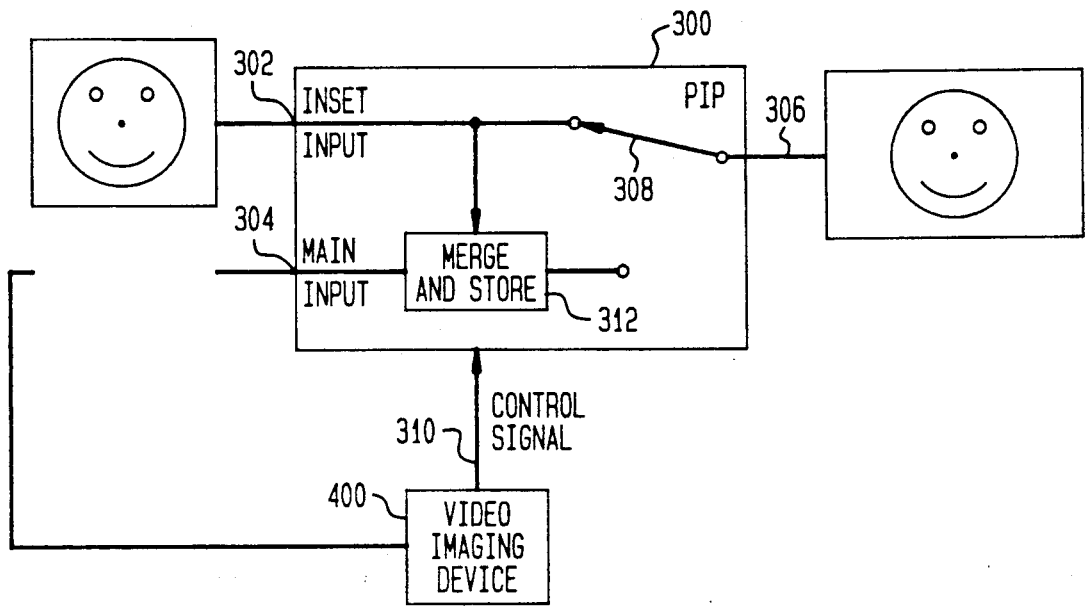
FIGS. 6A and 6B schematically illustrate a picture-in-picture circuit for use in the teleconferencing system of FIG. 5.
Figure 6B:
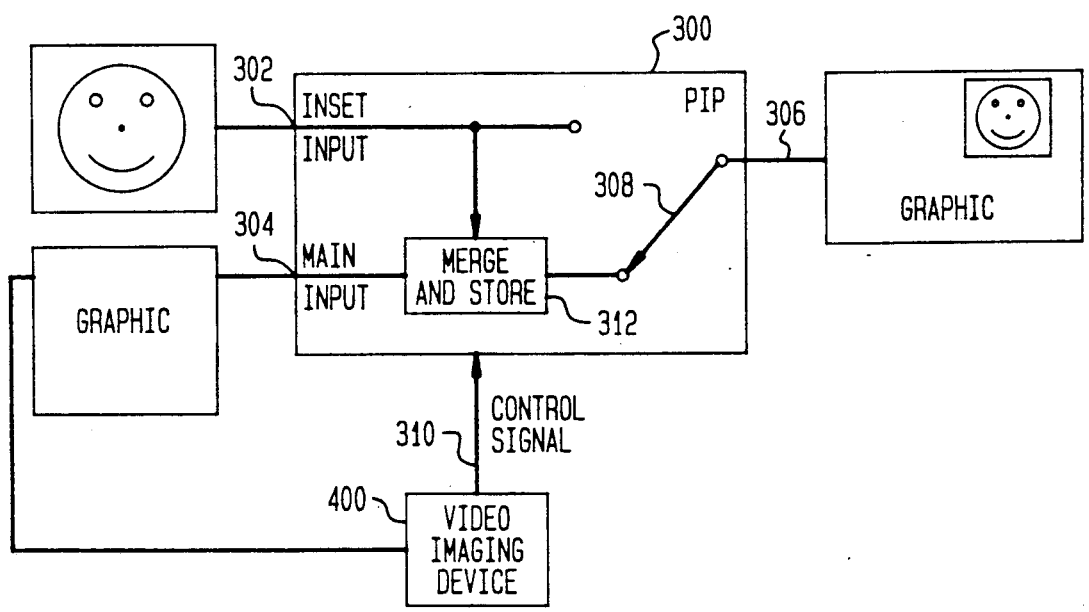

The operation of the PIP devices 121, 126, 141, 146 of FIG. 5 may be understood with greater clarity in connection with FIGS. 6A and 6B. FIG. 6A shows how a PIP device operates when an associated video imaging device is not being utilized and FIG. 6B shows how a PIP device operates when an associated video imaging device is being utilized.

FIG. 6A shows a PIP device 300 which is associated with a video imaging device 400 in accordance with the present invention. The PIP device 300 has two inputs 302 and 304. The input 302 is an "inset input" and the input 304 is a "main input". The input 302 receives a video signal input from an external camera. The input 304 is associated with the video camera in the video imaging device 400. Since the video imaging device 400 is not being used in FIG. 6A, there is no video input signal at the main input 304. The PIP device 300 also has an output 306. In FIG. 6A, a switch 308 is connected directly to the inset input 302. Thus the video signal present at the input 302 is transmitted directly to the output 306. In this mode of operation, a control signal on line 310 is not asserted because the video imaging device 400 is not being utilized. In addition, the merge and store circuit 312 is not active.

In FIG. 6B copy material is placed on an operating surface of the video imaging device 400 and this causes a control signal to be asserted on line 310. The control signal causes the switch 308 to be connected to the merge and store circuit 312. As indicated above, the control signal may be generated by a vacuum sensor 46 (FIG. 1) or a load sensor 65 (FIG. 3). When the device 400 is activated, the video camera (see e.g. camera 30 of FIG. 1) inside the device 400 outputs a video signal to the input 304.

Illustratively, the merge and store circuit 312 samples every third pixel of every third line of the video signal present at the inset input 302 so as to reduce the video signal at the input 302 to an image one-ninth its original size. This reduced size video signal is then inset into the video signal present at the main input 304 to form a composite image at the output 306. In this manner the information contained in the copy material at video imaging device 400 is the dominant portion of the display at the output 306 while the video image at the input 302 appears as a small inset.

In short, a video imaging device has been disclosed. The video imaging device permits a first teleconference participant to transmit information contained on copy material to a second teleconference participant for display in a portion of a video image viewed by the second teleconference participant. The video imaging device automatically reconfigures itself to transmit information contained on transparent, translucent, or opaque copy material.

Finally, the above described embodiments of the invention are intended to be illustrative only. Numerous alternative embodiments may be devised by those skilled in the art without departing from the spirit and scope of the following claims.

We claim:

1. A video imaging device for transmitting a video image of copy material comprising
    a sheet which can be switched between a translucent and a transparent state,
    a video camera for viewing said copy material through said sheet,
    an optical sensor for sensing the amount of ambient light transmitted through said sheet, said amount of ambient light depending on whether said copy material is transparent or translucent, and
    a control circuit for causing said sheet to be transparent when said copy material is translucent and for causing said sheet to be translucent when said copy material is transparent.

2. The video imaging device of claim 1 wherein said video imaging device includes an internal source of lighting, wherein said control circuit activates said internal source of lighting and causes said sheet to be transparent when said copy material is opaque.

3. The video imaging device of claim 1 wherein said device include means for holding said copy material in contact with said sheet.

4. The video imaging device of claim 1 wherein said device is contained in an enclosure, wherein said enclosure includes a source of vacuum for holding copy material in close contact with said sheet, and wherein said device includes a vacuum sensor for producing an output signal indicative of the presence of copy material.

5. The video device of claim 1 wherein said sheet comprises a liquid crystal material.

6. The video imaging device of claim 1 wherein said video imaging device includes means for generating an electrostatic holding force on said copy material and sensor means for providing an output signal indicative of the presence of copy material.

7. The video imaging device of claim 1 wherein said device includes sensor means for providing a signal indicative of the presence of copy material.

8. The video imaging device of claim 7 wherein said signal activates a picture-in-picture device associated with a teleconferencing system so that said copy material may be viewed in a video display.

9. The device of claim 1 wherein said video imaging device includes a video projector for projecting a video image onto a rear surface of said sheet when copy material is not present.

10. A video imaging device for use in a teleconferencing system for transmitting a video image of transparent or translucent copy material, said video imaging device comprising,
    a liquid crystal sheet which can be switched between a translucent and a transparent state,
    sensor means for providing an output signal indicative of the presence of copy material,
    a video camera which can view said copy material through said liquid crystal sheet,
    an optical sensor for sensing the amount of ambient light transmitted through said sheet, the amount of ambient light depending on whether said copy material is transparent or translucent, and
    control means responsive to said optical sensor for causing said liquid crystal surface to be transparent when said copy material is translucent and for causing said liquid crystal surface to be translucent when said copy material is transparent.

11. The video imaging device of claim 10 wherein said output signal activates a picture-in-picture device for combining a first video signal produced by said camera with a second video signal to produce a composite video image at a teleconferencing station.

12. The video imaging device of claim 10 wherein said copy material is transparent, translucent or opaque, wherein said device includes an internal light source and wherein said control circuit causes said liquid crystal sheet to be transparent and activates said internal light source when said copy material is opaque.

* * * * *